US009035510B2

(12) United States Patent
Simpson

(10) Patent No.: US 9,035,510 B2
(45) Date of Patent: May 19, 2015

(54) MOTOR WITH TORSIONAL ISOLATION MEANS

(75) Inventor: Roger T. Simpson, Ithaca, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 430 days.

(21) Appl. No.: 13/256,756

(22) PCT Filed: Mar. 22, 2010

(86) PCT No.: PCT/US2010/028099
§ 371 (c)(1),
(2), (4) Date: Sep. 15, 2011

(87) PCT Pub. No.: WO2010/111164
PCT Pub. Date: Sep. 30, 2010

(65) Prior Publication Data
US 2012/0007454 A1 Jan. 12, 2012

Related U.S. Application Data

(60) Provisional application No. 61/211,258, filed on Mar. 27, 2009.

(51) Int. Cl.
H02K 7/00 (2006.01)
F16D 3/12 (2006.01)
F16D 3/64 (2006.01)
F16D 3/76 (2006.01)
H02K 7/18 (2006.01)
H02K 7/116 (2006.01)

(52) U.S. Cl.
CPC .............. *H02K 7/1823* (2013.01); *H02K 7/116* (2013.01)

(58) Field of Classification Search
CPC ........ H02K 7/18; H02K 7/1807; F16F 15/1216
USPC ................ 310/75 D, 66; 464/97, 160, 86
See application file for complete search history.

(56) References Cited

U.S. PATENT DOCUMENTS

| 1,275,029 | A | * | 8/1918 | Holy | 74/410 |
| 1,612,321 | A | * | 12/1926 | Soderberg | 464/78 |
| 2,437,954 | A | * | 3/1948 | Havill | 464/97 |
| 2,703,847 | A | * | 3/1955 | Kalikow | 290/46 |
| 3,673,813 | A | * | 7/1972 | Wright | 464/24 |
| 4,012,923 | A | * | 3/1977 | Lundgren | 464/90 |
| 4,172,985 | A | * | 10/1979 | Meier | 310/74 |

(Continued)

FOREIGN PATENT DOCUMENTS

| EP | 0411600 A1 | 2/1991 | |
| EP | 1300926 | * 9/2003 | H02K 7/18 |

(Continued)

OTHER PUBLICATIONS

International Search Report and Written Opinion for Application PCT/US2010/028099 Filed on Oct. 19, 2010.

*Primary Examiner* — Burton Mullins
(74) *Attorney, Agent, or Firm* — Warn Partners, P.C.

(57) ABSTRACT

An electro-mechanical energy conversion device is provided having an armature with a central cavity. The armature is rotatably mounted in a frame. A torsion bar is positioned within the armature with one end connected to the armature and the other end connected with an energy source or consuming device.

3 Claims, 4 Drawing Sheets

(56) References Cited

U.S. PATENT DOCUMENTS

| | | | |
|---|---|---|---|
| 4,432,245 A * | 2/1984 | Hattori et al. | 73/862.321 |
| 4,825,718 A * | 5/1989 | Seifert et al. | 74/573.11 |
| 5,328,408 A * | 7/1994 | Wolf et al. | 464/180 |
| 5,352,157 A * | 10/1994 | Ochs et al. | 464/89 |
| 6,834,737 B2 * | 12/2004 | Bloxham | 180/165 |
| 7,252,060 B2 | 8/2007 | Mott | |
| 7,503,431 B2 * | 3/2009 | Sperber et al. | 185/45 |
| 2005/0116403 A1 * | 6/2005 | Wellman | 267/279 |
| 2007/0272472 A1 | 11/2007 | Matsubara et al. | |
| 2010/0307173 A1 * | 12/2010 | Guo et al. | 62/84 |

FOREIGN PATENT DOCUMENTS

| | | | | |
|---|---|---|---|---|
| JP | 61-135345 | * | 6/1986 | H02K 7/10 |
| JP | 2002-317646 | * | 10/2002 | H02K 7/18 |
| JP | 3888148 B2 | | 2/2007 | |

* cited by examiner

MOTOR WITH TORSIONAL ISOLATION MEANS

FIELD OF THE INVENTION

The field of the present invention is that of electro-mechanical energy conversion devices. More particularly, the present invention relates to an application of electro-mechanical energy conversion devices in hybrid electric vehicles.

BACKGROUND OF THE INVENTION

Many hybrid electrical vehicles have power trains wherein a reciprocating piston engine is torsionally connected with the vehicle wheels through an intervening motor generator. Typically in the drive train of a hybrid electric vehicle, the motor generator is torsionally connected to a crank shaft of the engine via a chain or a gear system. Accordingly, the motor generator is subjected to the inherent torsional spikes generated by the crank shaft of the reciprocal piston engine. Isolating the torsional spikes can reduce the peak load into the drive system of a vehicle and of the motor generator thus improving the NVH (noise, vibration and handling) and durability of the drive system. Typically, the torsional isolation is provided by either a torsion bar or a torsional damper. Typically, when a torsion bar is utilized, increased axial spacing is required for the portion of the drive train between the engine and the motor generator. If a proposed overall required length of the drive train is found to be undesirable, then a radial spring type damper is utilized. However, most radial spring dampers are relatively large in their radial dimensions as compared with the radial dimensions of an armature shaft of a motor generator. In hybrid electric vehicles, as in most vehicles, it is desirable to make the power train occupy a space as small as possible to comply with other aerodynamic requirements of the vehicle. Accordingly, it is desirable to provide a hybrid electric vehicle wherein a reciprocating piston engine can be torsionally connected with a motor generator while providing maximum torsional isolation between the reciprocating piston and the motor generator. It is desirable to provide the above in as small of a space as possible.

SUMMARY OF THE INVENTION

To make manifest the above noted and other desires, a revelation of the present invention is brought forth. In a preferred embodiment, the present invention provides an electro-mechanical energy conversion device having an armature with a generally central cavity. The armature is rotatably mounted in a frame. A torsion bar is positioned within the armature central cavity. The torsion bar has a first end torsionally connected with the armature adjacent an end of the armature. The torsion bar has a second end for transmission of torsional force between the electro-mechanical energy conversion device and an energy source or consuming object such as a reciprocating piston engine or vehicle drive train. The electro-mechanical energy conversion device of the present invention is advantageous in that it provides a high degree of torsional isolation in a small space envelope.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
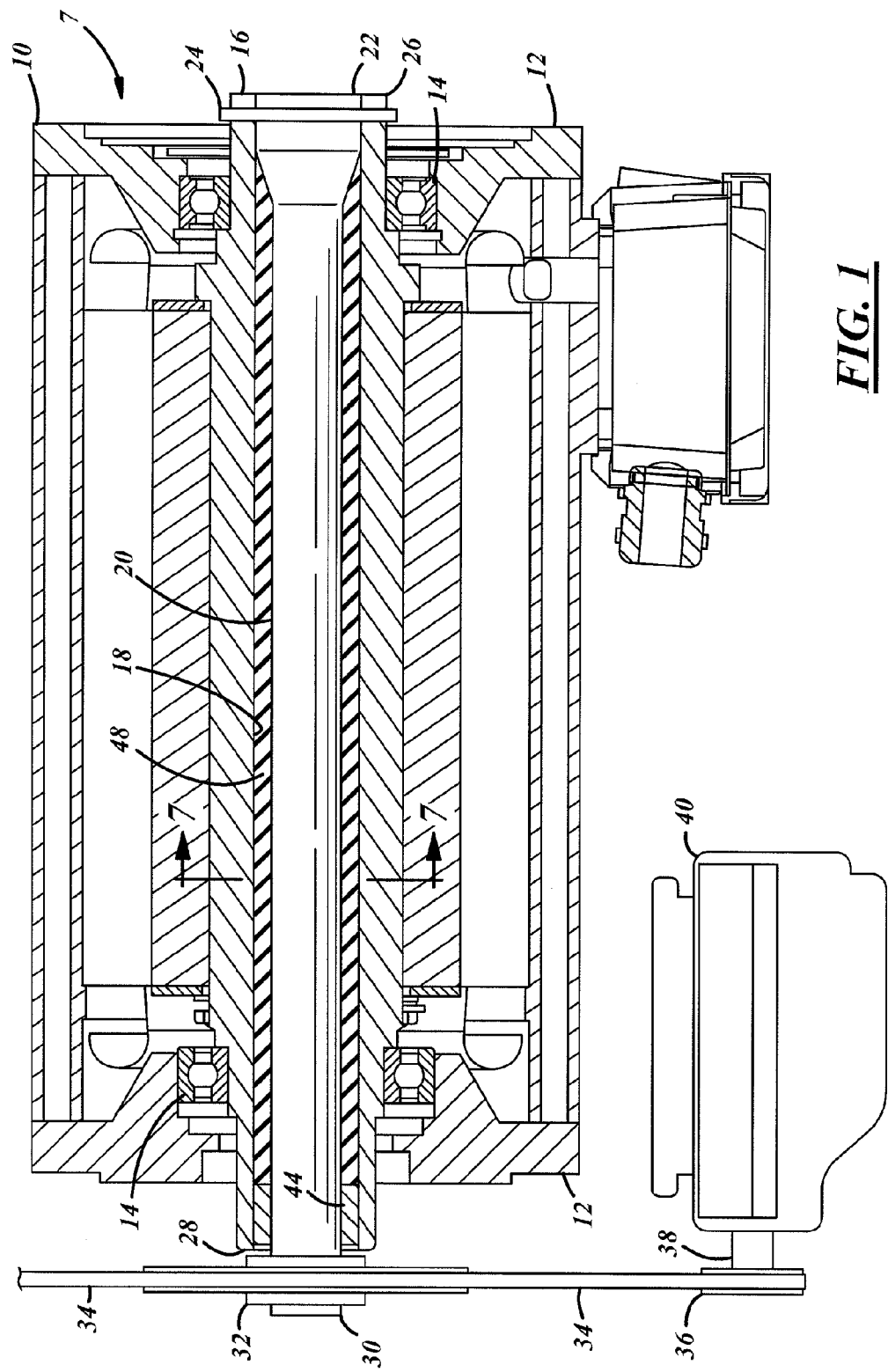
FIG. 1 is a sectional view of a preferred embodiment electro-mechanical energy conversion device according to the present invention.

The following description of the preferred embodiment(s) is merely exemplary in nature and is in no way intended to limit the invention, its application, or uses.

The electro-mechanical energy conversion device 7 according to the present invention has a frame 10. The frame 10 includes two end caps 12. The end caps 12 mount roller bearings 14. The roller bearings 14 rotatably mount an armature 16. The armature 16 has a central cavity 18. The electro-mechanical device is typically a variable speed motor generator. Positioned within the central cavity 18 of the armature is a torsion bar 20. The torsion bar 20 can be a solid member or it may be tubular. Typically, the torsion bar will be metallic. The torsion bar has a first end 22. The torsion bar is torsionally connected with the armature 16 generally adjacent the torsion bar first end 22. Typically, the torsion bar first end 22 will be press fitted or spline connected to the armature 16. A pin 24 is also provided which typically only connects to the torsion bar 20 axially within the armature 16. As used in the present description, the end of the armature essentially means that that portion of the armature adjacent to the end cap 12. As is apparent to those skilled in the art, the armature at its end 26 in many applications will be extended to provide an alternate torsional connection with a drivetrain of a hybrid electric vehicle or other device that the electro-mechanical energy conversion device 7 is being utilized with.

Adjacent a second end 28 of the armature, a torsion bar has a second end 30. The torsion bar second end 30 is torsionally connected with a torsional transmission member which is typically a sprocket, gear or a belt drum. In most applications, the torsional force transmission member 32 will be a sprocket. The sprocket is operatively associated with a chain (shown schematically) 34 which is engaged with another sprocket 36. Sprocket 36 is torsionally connected with a crank shaft 38 of a reciprocating piston engine 40 (shown schematically).

At the second end 28 of the armature is a mounted bearing 44. The bearing 44 will typically have a press fit with the central cavity 18 of the armature while having a generally smooth non-interference fit with the torsion bar 20 to support the torsion bar 20 adjacent its second end 30. Captured between the outer surface of the torsion bar 20 and the inner cavity 18 of the armature, is a damping material 48. The damping material 48 will typically be an elastomeric material such as soft rubber, or other suitable alternatives. In some applications, it may be desirable to the damping material 48 to be connected of the outer surface of the torsion bar 20 but only be frictionally engaged with the central cavity 18 of the armature. In other embodiments the damping material will be connected with the armature and have sliding or rubbing contact with the torsion bar.

Figure 7:
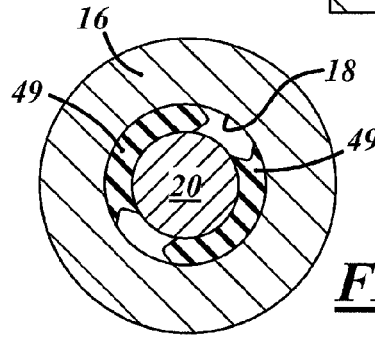
FIG. 7 is a sectional view taken along line 7-7 of FIG. 1.

In operation, when the electro-mechanical energy conversion device 7 operates as a generator in a drivetrain of a hybrid electric vehicle, power from the reciprocating piston internal combustion engine 40 will come out of crank shaft 38 and via sprocket 36, chain 34 and sprocket 32 will provide a torsional input into the second end 30 of a torsion bar 20. The torsion bar will then transmit torsional power to its first end 22 wherein the torsional input will then be transferred to the armature end 26. Torsional isolation is provided by the torsion bar which can twist relative to the armature and is allowed to freely do so by the bearing 44. The above noted action alone provides torsional isolation. The torsional isolation is further enhanced by torsional damping provided the soft rubber 48 which is captured between the surface of the torsion bar 20 and the armature inner cavity 18. Typically the chain 34 is also connected with another sprocket (not shown) which powers a portion of the vehicle drive train down stream the electro-mechanical energy conversion device 7. When the electro-mechanical energy conversion device 7 is operating as a motor (especially in times of initial start-up of a hybrid electric vehicle wherein the engine 40 may not be engaged) torsional power will be transferred from the electro-mechanical energy conversion device 7 to another portion of the vehicle drive train. Typically the angular direction of rotation of the armature 16 when the device 7 is acting as a generator is common with the direction of rotation when acting as a motor. It is sometimes desirable for the torsional damping to be greater when the device 7 is acting as a generator than as a motor. In an alternative embodiment of the device 7 shown in FIG. 7, the damping material has dual folded hydrofoil cross-sectional configuration 49 to provide greater torsional isolation when torque is being transferred in a clockwise angular direction when the device is operating as a generator.

Figure 2:
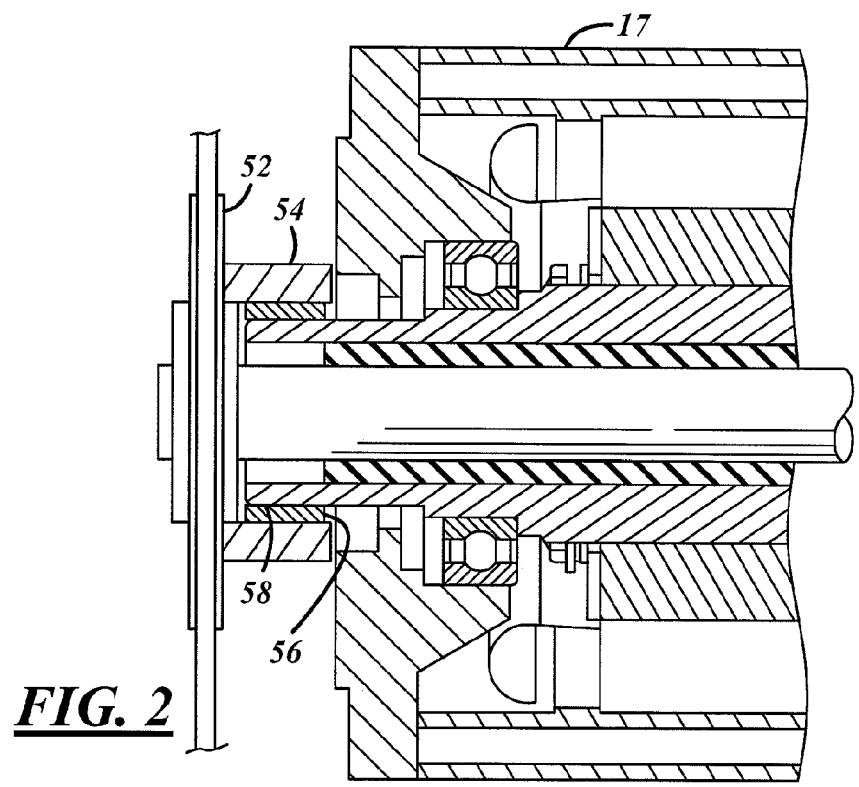
FIG. 2 is a partial sectional view similar to that of FIG. 1 of an alternate preferred embodiment electro-mechanical energy conversion device according to the present invention.

Referring to FIG. 2 with similar items being given identical reference numerals, a motor generator 17 is provided having a torsion bar connected with a sprocket 52. The sprocket 52 is torsionally connected with an annular drum 54 which is fitted over on a journal bearing bushing 56 which is press fit upon the OD 58 of a portion of the armature 16. It is also apparent to those skilled in the art that in still another embodiment, the journal bearing bushing 56 may be mounted by being press fit within the ID of the drum 54 and then slipped on to the OD 58 of the armature 16. The journal bearing bushing 56 provides a bearing function between the annular drum 54 and the armature. In either of the aforementioned configurations with the bearing 56, if desirable, it can have a slight frictional engagement with either the armature or the drum 54 to provide for frictional damping.

Figure 3:
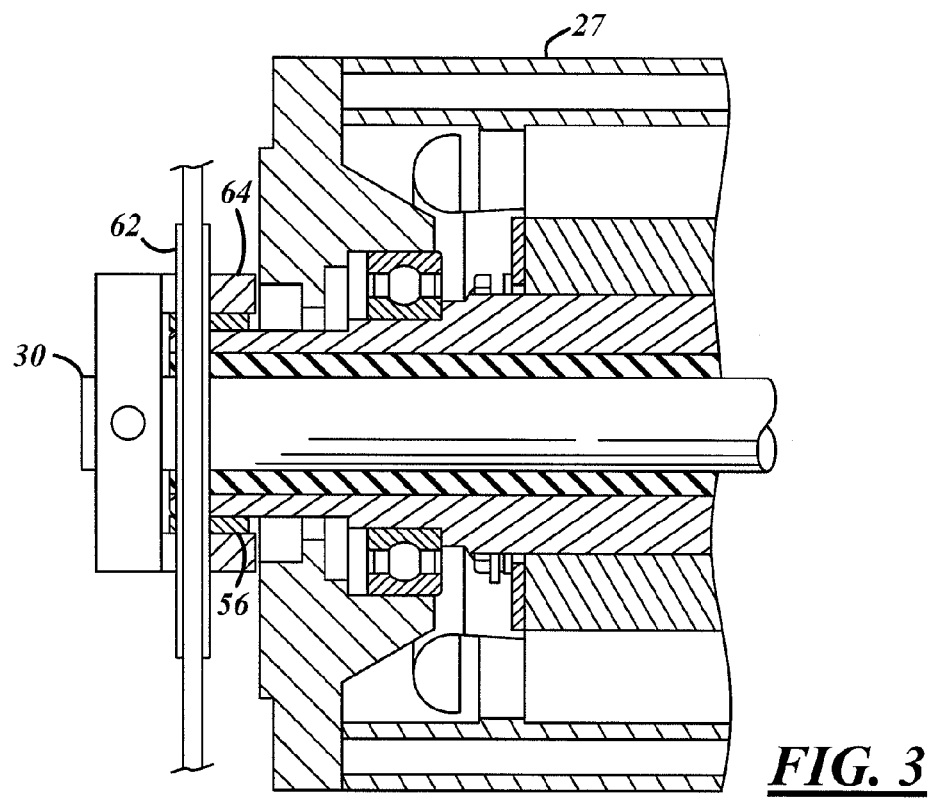
FIG. 3 is a partial sectional view of another alternate preferred embodiment electro-mechanical energy conversion device according to the present invention.

Referring to FIG. 3, an embodiment 27 electro-mechanical energy conversion device which is essentially similar to the second embodiment shown in FIG. 2 except having a different sprocket 62. Sprocket 62 is connected with a drum 64 in such a manner that it is radially aligned with the bearing 56 rather than being offset axially outward as shown in the embodiment 17 electro-mechanical energy conversion device shown in FIG. 2. Typically, this configuration is found to give superior radial support to the torsion bar 20 second end.

Figure 4:
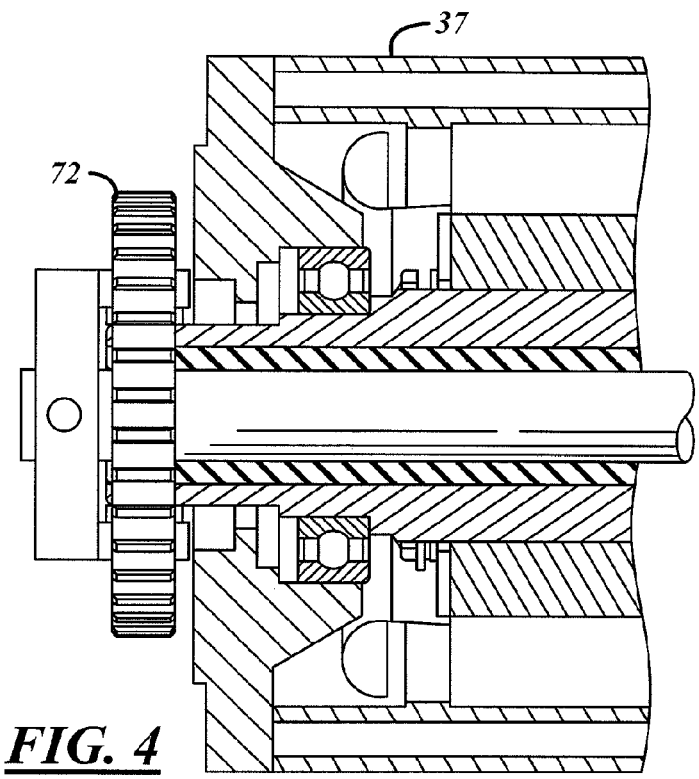
FIG. 4 is a partial sectional view of another alternate preferred embodiment electro-mechanical energy conversion device according to the present invention.

FIG. 4 brings forth an embodiment 37 electro-mechanical energy conversion device according to the present invention which is essentially similar to that of embodiment 27 shown in FIG. 3 wherein the sprocket 62 is substituted by a gear 72.

Figure 5:
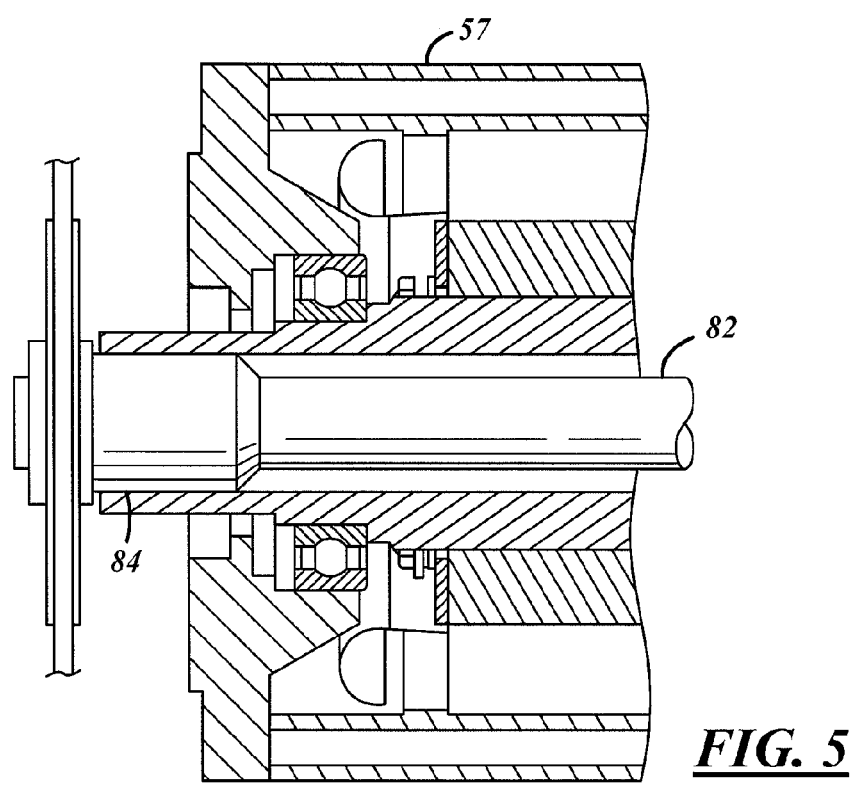
FIG. 5 is a partial sectional view another alternate preferred embodiment electro-mechanical energy conversion device according to the present invention.

FIG. 5 is an embodiment 57 electro-mechanical energy conversion device 57 essentially similar to that of shown in FIG. 1 of embodiment 7 with the exception that bearings 44 are eliminated and a torsion bar 82 has a enlarged end 84 which is supported by the interior of the armature 16.

Figure 6:
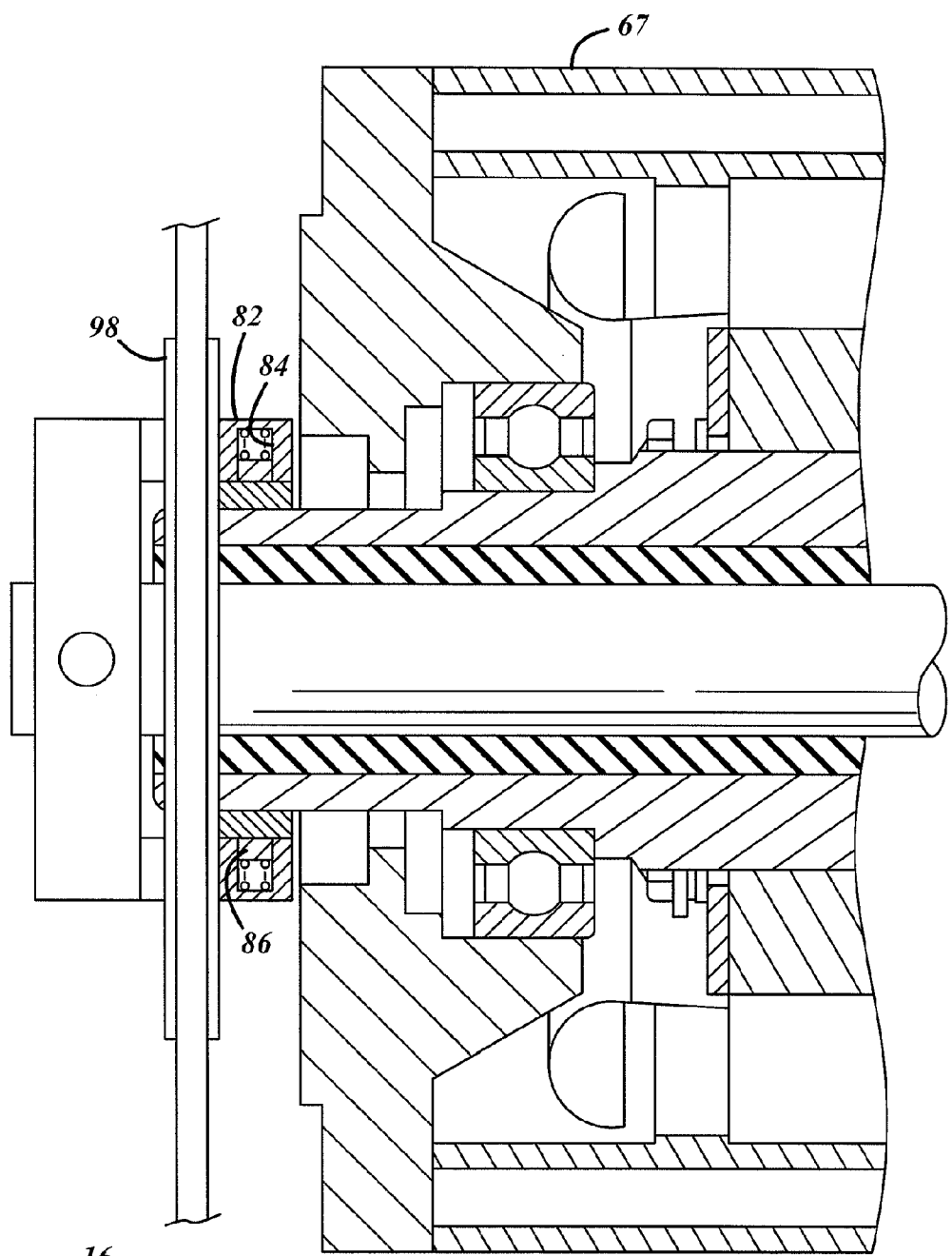
FIG. 6 is a partial sectional view of another alternate preferred embodiment electro-mechanical energy conversion device according to the present invention.

FIG. 6 shows another preferred embodiment electro-mechanical energy conversion device 67 according to the present invention which is very similar to embodiment 17 shown in FIG. 2 however, having a different sprocket 98. Sprocket 98 is connected with a drum 82. The drum 82 has a series of radial pocket slots 84 which have inserted therein spring loaded friction members or damper blocks 86 to provide frictional damping. Radial threaded caps (not shown) may be added to the drum to allow for adjustment of the frictional damping.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor generator comprising:
   an armature having a central cavity;
   a frame rotatably mounting said armature by two roller bearings; and
   a torsion bar positioned within said armature central cavity, said torsion bar having a first end torsionally connected with said armature adjacent end of said armature and said torsion bar having a second end;
   soft elastomeric torsional damping material captured between said torsion bar and said armature, said material having a dual folded hydrofoil cross-sectional configuration causing greater torsional isolation when torque is being transferred when said motor generator is operating as a generator;
   an annular drum for torsional connection with a mechanical energy source or consuming device, said annular drum being torsionally connected with said torsion bar second end; and
   a journal bearing bushing positioned radially between an interior of said annular drum and an exterior portion of said armature, said journal bearing bushing having a press fit connection with one of said interior of said annular drum and said exterior of said armature and providing a bearing relationship between said annular drum and said armature.

2. A motor generator as described in claim 1 wherein said annular drum is connected with a torsional force transmission device radially aligned with said journal bearing bushing.

3. A motor generator as described in claim 1 wherein said annular drum is connected with a torsional force transmission device taken from a group of sprockets, belt drums and gears.

* * * * *